3,770,689
PROCESS FOR THE ANIONIC CATALYTIC POLYMERIZATION OF LACTAMS
Josef L. M. van der Loos and Peter J. M. W. Claassen, Sittard, Netherlands, assignors to Stamicarbon N.V., Heerlen, Netherlands
No Drawing. Filed Jan. 21, 1971, Ser. No. 108,583
Claims priority, application Netherlands, Jan. 24, 1970, 7001021
Int. Cl. C08g 20/18
U.S. Cl. 260—33.2 R                                7 Claims

ABSTRACT OF THE DISCLOSURE

An improved process for the anionic, catalytic polymerization of lactams with the aid of one or more promoters is disclosed whereby a polyamide polymer having improved impact resistance is produced. The polymerization is carried out in the presence of a polyether with etherified OH groups and which is soluble in the molten lactam reaction mixture.

---

The present invention relates to an improved process for anionic polymerization of lactams in the presence of a catalyst.

Anionic, catalytic polymerization of lactams, using an alkali metal compound as the catalyst, can be considerably accelerated by adding a promoter to the polymerization reactants. The promoters suggested by the prior art are (1) compounds containing a tertiary nitrogen atom to which two or more carbonyl, thio carbonyl, sulphonyl or nitroso groups are bound, (2) compounds which react with the monomeric lactam to form one of the above compounds, for instance isocyanates, acid chlorides, acid anhydrides, and (3) such compounds as bislactim ethers and lactones. When the catalytic, anionic polymerization is carried out in the presence of these promoters, the polymerization is accomplished in a shorter time and at temperatures below the melting point of the polyamide. When using these promoters, lactams whose molecule contains at least 4 carbon atoms in the ring can be polymerized to a solid product which takes the shape of the reaction space in which the polymerization was carried out. Unfortunately, however, the polyamide polymers produced, when using these promoters, have a low impact resistance, especially when the polyamides are in the uncondiitoned, dry state.

To obtain a polyamide with increased impact resistance, it has been proposed to use special promoters such as polycarbodiimides (see Canadian patent specification No. 812,889) and polymethylene polyphenylisocyanate (see U.S. Pat. No. 3,423,372), in addition to the above-mentioned promoters. It has also been proposed to add a polyether to the polymerization mixture when an isocyanate is used as promoter (see U.S. patent application No. 22,684, filed Mar. 25, 1970). These efforts to obtain a polyamide polymer with increased impact resistance have not been completely successful. For example, when a polyether with free OH groups is added in an attempt to improve the impact resistance of the polyamide polymer, the activity of promoters other than the isocyanates is interfered with and the polymerization time becomes excessively long and does not yield a particularly good product.

An object of the present invention is to provide a process for producing polyamide polymers having increased impact resistance. It has been found that a polyamide polymer having increased impact resistance can be produced in the anionic catalytic polymerization of lactams by adding to the reaction mixture one or more polyether compounds whose OH groups have been etherified and which is soluble in the molten lactam or lactam mixture. It has been further found that the etherified polyether compounds do not inhibit the action of the conventional promoters which are added to the reaction mixture to reduce polymerization time and temperature. The etherified polyether can be added in amounts ranging from about 1% to at most 25%, and preferably between 5% and 15%, by weight based on the lactam.

Examples of lactam-soluble polyethers whose OH groups can be blocked by esterification are: tetrahydrofurane, polyepichlorohydrin, poly-glycidyl ethers, polyethyleneglycol, polypropyleneglycol, copolymers of ethyleneglycol with propyleneglycol and alkyl-phenoxy-polyethylene-oxide-ethanol. Preferably, the etherified polyether should have a molecular weight of at least 500 and remain soluble in molten lactam. Generally, the etherified polyether having a molecular weight of less than 20,000 are soluble in the molten lactam.

The hydroxyl groups of these polyethers can be etherified with many different types of groups, for instance alkyl, cycloalkyl, aryl and alkaryl groups having from 1 to 15 carbon atoms. Generally the etherified group is a lower alkyl in particular methyl, because the availability of lower alkyl compounds which will react with the OH group.

Among the conventional promoters of the prior art that are particularly suited for use in the process of the present invention are those of a polymeric nature which are soluble in the molten lactam or lactam mixture. Promoters of a "polymeric nature" is meant here to comprise compounds consisting of a polymer chain to which are bound, either direct or indirect, one or more promoter groups.

Examples of such polymer chains are polyethers which are permanently terminated by a group carrying a promoter function on at least one end of the polymer chain, polyethers comprising a monomer carrying a promoter function, and copolymers of an ethylenically unsaturated monomer carrying a promoter function with one or more other unsaturated compounds, as are shown in U.S. patent specification No. 3,136,738. Examples of this last group of copolymeric promoters are the styrene-maleic acid anhydride copolymer, the styrene-acryloylchloride copolymer, the styrene-isobutene-N-vinyl-succinimide copolymer, the styrene-itaconic acid anhydride copolymer, etc. The polymeric promoters preferably comprise copolymers formed from monomers carrying a promoter function and styrene monomers.

The promoter functions generally are substituents of the same type as the groups responsible for the activity of "monomeric" promoters. Examples are acid-chloride groups, isocyanate and isothiocyanate groups, N-carbonyl-lactam groups, imide groups, N-carbonyl-sulfonamide groups, N-carbonyl-urea groups and acid-anhydride groups.

The promoter function may be attached to a polymerisable monomer which is subsequently (co)polymerised, or may be introduced in a polymer chain after polymerisation. An example of the latter method is the chlorosulfonation. An example of the latter method is the chlorosulfonation of polystyrene or a styrene-ethylene copolymer, followed by a reaction with an acylamide or a lactam.

The polymeric promoters are added in amounts of at most 10% wt. based on the quantity of lactam and preferably between 1 and 5% wt. of such promoters are used. Well known, nonpolymeric promoters for polymerising lactams, as mentioned hereinbefore, can be used in amounts of about 0.1 to about 2 moles percent, based on the quantity of lactam. The non-polymeric promoters can be used in place of or in addition to the polymeric promoters. It has been found that desirable results are obtained by adding both the non-polymeric promoters and a polymeric promoter.

The catalyst employed in the polymerization can be lactam-N-anions, which are obtained, as is well known in the prior art, by reacting a metal compound and a lactam. The polymerisation is effected at a temperature in the range normally employed in anionic polymerization, e.g. between 90 and 250° C. and, preferably, between 125° and 200° C.

Among the lactam monomers which can be polymerized by the process of the present invention are omega lactams containing 4 to 16 carbon atoms in their ring, e.g. butyrolactam, caprolactam, oenantholactam and laurolactam. Mixtures of two or more lactams can also be polymerized by the present process. The structure and the properties of the polyamides can be controlled through the composition of the monomer mixture used in the process.

The invention will be understood more readily by reference to the following examples; however, these examples are intended to illustrate the invention and are not to be construed to limit the scope of the invention.

EXAMPLES 1–6 (Prior Art Comparative Examples)

Polyamide polymers were produced by polymerizing a lactam monomer comprising ε-caprolactam by conventional prior art processes. All polymerizations were conducted at a temperature of 160° C. and in the presence of NaH as a catalyst. In examples 1–4, styrene-maleic acid anhydride copolymer (sold commercially by Koppers under the designation Polymer-230) was added to the reaction mixture as the promoter. In Example 3, biscaprolactam ether was also added to the reaction mixture in addition to the styrene-maleic anhydride copolymer as an additional promoter. In Example 4 N-acetyl caprolactam was added to the reaction mixture in addition to the styrene-maleic anhydride copolymer as an additional promoter. In Example 5, a styrene-acryloylchloride copolymer was added to the reaction mixture as the promoter and in Example 6, biscaprolactim ether and polypropyleneglycol with free OH substituents (molecular weight of 2000) were added to the reaction mixture.

The polyamides produced were tested for notched impact strength (Izod value, kg./cm.$^2$) in accordance with ASTM standard D–256–56. The polyamides were then conditioned by suspending the polymer for 7 days in a controlled atmosphere at a temperature of 20° C. and relative humidity of 65%. The conditioned polyamides were then again tested for notched impact strength by the same process as mentioned hereinbefore. The elastic modulus (kg./cm.$^2$) of the conditioned polyamide polymers was determined according to ASTM standard 785 B. The elastic modulus being a measure of the rigidity of the polymer.

The results obtained in Examples 1–6 are shown in Table 1. Table 1 also indicates the proportion of catalyst and promoter used in each of Examples 1–6 based on the total amount of lactam monomer used and the polymerization time to obtain the polymer of each example. As can be seen from Table 1, Examples 1 and 2 yielded poorly polymerized products even at polymerization times of up to 90 minutes. The Izod value of the unconditioned polymer from Example 2 resulted from the high monomer content remaining in the polymer.

Examples 3–6 yielded polyamides of better quality then Examples 1 and 2 and with reduced polymerization time necessary, however, the impact resistance of these polymers was relatively low even after conditioning as seen by the low Izod value obtained.

EXAMPLES 7–13

Polyamide polymers were produced by polymerizing the same lactam monomers as in Examples 1–6. In Examples 7–13, etherified polyethers were added to the reaction mixture according to the present invention. Similar tests were made on the polymers of Examples 7–13 as were made on the polymers of Examples 1–6. The results are shown in Table II. Table II also indicates the proportions of catalyst, promoters and etherified polyether additives based on the total amount of lactam used for each of Examples 7–13. The molecular weights of the polymeric promoters is also indicated in Table II by the numbers following the promoter.

In Example 7 biscaprolactam ether was used as promoter, in Examples 8 and 13 the promoter was a copolymer of styrene with acryloylchloride, comprising 47 moles percent of acryloylchloride.

In Examples 9 to 12 the promoter used was a copolymer of styrene with maleic acid anhydride in addition to other promoters, such as biscaprolactam ether, the HCl salt of the biscaprolactim ether and acetylcaprolactam. In Example 12, the reaction product of reacting the copolymer styrene-maleic anhydride with caprolactam was added, in addition to a promoter consisting of acetyl caprolactam.

In Examples 7–13 which demonstrate the process of the present invention, a thoroughly polymerized polyamide of excellent notched impact strength was obtained. The rigidity of these polyamides was also good, as shown by the values measured for the elasticity modulus.

When a comparison of the results shown in Table I (prior art processes) with Table II (process according to the present invention) is made, it can be seen that a large improvement in impact resistance is obtained by the process according to the present invention. It is also to be noted that reaction time necessary to obtain good quality polymers by the present invention is comparable to the prior art processes which incorporate only promoters which decrease the reaction time. As is shown by the results of Example 6, when a polyether containing free OH groups is added to the reaction mixture containing the prior art promoters which decrease the time of reaction, the polyether interferes with the promoter action and the reaction time is greatly increased. The results of Examples 7–13 show conclusively that the etherified polyethers of the present invention do not interfere with the promoters and the reaction time is not increased by adding the etherified polyethers to the reaction mixture.

TABLE I

| Example | NaH (catalyst) moles percent | Non-polymeric promoter [1] | Moles percent polymeric promoter | Polymeric promoter [2] | Weight percent polymeric promoter | Polyether additive | Weight percent polyether additive | Polymerization time (min.) | Izod value before cond. | Izod value after cond. | Modulus of elasticity ($E_{mod.}$) | Remarks |
|---|---|---|---|---|---|---|---|---|---|---|---|---|
| 1 | 1 | | | A | 5 | | | 45 | 3.4 | | | Dark brown. |
| 2 | 1 | | | A | 2 | | | 90 | 10.4 | | | Contained 25–30% monomer. |
| 3 | 1.2 | D | 0.6 | A | 2 | | | 30 | 3.5 | 17.1 | 12,500 | |
| 4 | 1 | E | 0.2 | A | 2.5 | | | 30 | 2.8 | 24.0 | 12,900 | |
| 5 | 1 | | | B | 1 | | | 30 | 3.3 | 29 | 10,000 | |
| 6 | 2 | D | 1.0 | | | PPG [3] | 10 | 60 | 4.8 | 20.7 | 10,700 | |

[1] D is biscaprolactim ether; E is N-acetyl caprolactam.
[2] A is styrene/maleic anhydride copolymer; B is styrene/acryloylchloride copolymer.
[3] PPG is polypropylene glycol with an average molecular weight of 2,000.

TABLE II

| Ex. | NaH (catalyst) moles percent | Non-polymeric promoter [1] | Moles percent non-polymeric promoter | Polymeric promoter [2] | Weight percent polymeric promoter | Etherified polyether additive | Weight percent polyether additive | Polymerization time (min.) | Izod value before cond. | Izod value after cond. | Modulus of elasticity ($E_{mod.}$) | Remarks |
|---|---|---|---|---|---|---|---|---|---|---|---|---|
| 7 | 1.2 | D | 0.6 | | | MA-850 | 10 | 30 | 8.9 | 88 | 9,400 | |
| | 1.2 | D | 0.6 | | | DMPEG 3000 | 5 | 30 | 6.3 | 40 | 10,200 | |
| | 1.5 | D | 0.6 | | | MA-850 | 5 | 30 | 6.0 | 35 | 12,100 | |
| | 1.5 | D | 0.6 | | | MA-850 | 10 | 30 | 6.2 | 41.5 | 10,300 | |
| 8 | 1.0 | | | B | 1.0 | MA-850 | 10 | 30 | 9.9 | N.r. | 9,000 | |
| 9 | 1.2 | D | 0.6 | A | 2.5 | DMPEG 3000 | 10 | 30 | 5.4 | 80 | 13,000 | |
| | 1.2 | D | 0.6 | A | 5.0 | DMPEG 3000 | 10 | 30 | 7.7 | 115 | 11,400 | |
| 10 | 1.0 | E | 0.2 | A | 1.0 | DMPEG 3000 | 10 | 30 | 5.5 | N.r. | 11,250 | |
| | 1.0 | E | 0.2 | A | 2.5 | DMPEG 3000 | 10 | 30 | 6.0 | N.r. | 10,800 | |
| 11 | 1.2 | D | 0.6 | A | 1.0 | MA-1500 | 10 | 30 | 5.2 | 99 | 11,900 | |
| | 1.2 | D | 0.6 | A | 2.5 | DMPPG 2000 | 10 | 30 | 5.3 | 82 | 12,900 | |
| 12 | 1.0 | F | 0.4 | A | 2.5 | DMPEG 3000 | 10 | 30 | 7.1 | N.r. | 7,500 | |
| | 1.0 | E | 0.2 | C | 3.0 | DMPEG 3000 | 10 | 30 | 5.2 | N.r. | 11,600 | |
| 13 | 1.0 | E | 0.2 | B | 1 | MA | 10 | 30 | 7.9 | N.r. | 10,100 | |
| | 1.0 | E | 0.2 | B | 1 | DMPEG 3000 | 10 | 30 | 6.3 | N.r. | 9,700 | |

[1] D is biscaprolactim ether; E is N-acetyl caprolactam; F is biscaprolactim ether hydrochloride.
[2] A is styrene-maleic anhydride copolymer; B is styrene-acryloyl-chloride copolymer; C is the product obtained by reacting A with ε-caprolactam. This product contains 19.3% by weight of polyamide.

NOTE.—N.r.=No rupture under experimental conditions; MA=Nonylphenoxy-polyethyleneglycolmethylether; DMPEG=dimethoxypolyethyleneglycol; DMPPG=dimethoxypolypropyleneglycol.

What is claimed is:

1. In a process for the anionic, catalytic polymerization, with at least one promoter compound and in the presence of at least one alkali metal compound as catalyst, of lactams to produce solid polyamide, said lactams having about 4–16 carbon atoms in the ring, the improvement comprising conducting the polymerization in the presence of about 1 to 25% by weight, based on the lactam in the reaction mixture, of a polyether compound free from hydroxyl groups, said polyether compound containing OH groups which have been etherified, with the hydrogen atom of each OH group being replaced by a member having 1–15 carbon atoms and selected from the group consisting of lower alkyl, cycloalkyl, aryl and alkaryl, the etherified polyether compound having a molecular weight of at least 850 and being soluble in molten lactam.

2. A process as claimed in claim 1, wherein the polyether compound is selected from the group consisting of polytetrahydrofurane, polyepichlorohydrin, poly-glycidyl ethers, polyethylene glycol, polyproplene-glcol, copolymers of ethyleneglycol and propyleneglycol and alkylphenoxy-polyethylene-oxide-ethanol, the hydroxyl groups of these compounds having been etherified with the hydrogen atom of each OH group being replaced by a member selected from said group.

3. A process as claimed in claim 1, wherein 5–15% wt. of polyether is added.

4. A process as claimed in claim 1, wherein the promoter used is a compound which is soluble in the molten lactam reaction mixture and consists of a polymer chain with one or more promoter groups bound to it.

5. A process as claimed in claim 3, wherein the promoter used is a copolymer of styrene with an ethylenically unsaturated compound carrying a promoter group.

6. A process as claimed in claim 4, wherein a non-polymeric promoter is also added to the reaction mixture.

7. A polyamide polymer produced by the process of claim 1.

References Cited
UNITED STATES PATENTS
3,704,280  11/1972  Van Der Loos et al.
260—77.5 AM WILLIAM H. SHORT, Primary Examiner
L. M. PHYNES, Assistant Examiner U.S. Cl. X.R.
260—78 L & P, 857 G